United States Patent [19]

Duffy et al.

[11] Patent Number: 4,627,386

[45] Date of Patent: Dec. 9, 1986

[54] STEAM GENERATORS AND COMBINED CYCLE POWER PLANTS EMPLOYING THE SAME

[75] Inventors: Thomas E. Duffy, San Diego; John P. Archibald, La Jolla; Alan H. Campbell, Encinitas, all of Calif.

[73] Assignee: Solar Turbines, Inc., San Diego, Calif.

[21] Appl. No.: 723,648

[22] Filed: Apr. 16, 1985

Related U.S. Application Data

[63] Continuation of Ser. No. 483,437, Apr. 8, 1983, abandoned.

[51] Int. Cl.[4] ............................................. F22B 33/14
[52] U.S. Cl. ................................. 122/1 B; 122/7 R; 122/510; 122/512
[58] Field of Search .................... 122/7 R, 235 F, 510, 122/DIG. 13, 1 B, 6 A, 367 C, 511, 512

[56] References Cited

U.S. PATENT DOCUMENTS

| | | |
|---|---|---|
| 1,860,364 | 5/1932 | LaMont . |
| 2,013,829 | 9/1935 | Keenan ........................... 122/7 R |
| 2,105,819 | 1/1938 | Parsons . |
| 2,345,257 | 3/1944 | Hensel . |
| 2,842,103 | 7/1958 | Profos . |
| 3,144,856 | 8/1964 | Brunner . |
| 3,173,405 | 3/1965 | Evans . |
| 3,267,914 | 8/1966 | Connel . |
| 3,349,003 | 10/1967 | Kayo . |
| 3,357,411 | 12/1967 | Kamm . |
| 3,384,053 | 5/1968 | Fleischer . |
| 3,404,663 | 10/1968 | Lewis et al. . |
| 3,769,795 | 11/1973 | Rostrom . |
| 3,953,466 | 5/1976 | Mantz et al. . |
| 4,263,964 | 4/1981 | Masai et al. ......................... 122/510 |

OTHER PUBLICATIONS

Stambler, "Field Test 5-MW Combined Cycle Package Set for 1978" in *Gas World*, Mar., 1976.

Wardall et al. "The Outlook for Combined Cycle Efficiency with Small Gas Turbines" in *Energy Processing-/Canada*, Mar.-Apr., 1976.

Wardall et al. "Current Prospects for Efficient Combined Cycles for Small Gas Turbines" Paper Presented at ASME Gas Turbine Conference, Mar., 1976.

Schwam, "Current Status of Solar Combined Cycle Development" paper presented at American Gas Transmission Conference, May, 1977.

*Primary Examiner*—Louis J. Casaregola
*Attorney, Agent, or Firm*—Hughes & Cassidy

[57] ABSTRACT

A compact, unfired, staggered tube, once-through steam generator or boiler of simple construction intended primarily for combined cycle power plants in which the thermal energy utilized to generate steam is obtained from the exhaust gases of a gas turbine engine. The boiler provides steam at two different pressure levels, which maximizes recovery of thermal energy; and all wettable components in the steam/water loop are fabricated of corrosion resistant materials. This eliminates the need for controlling the pH of the feedwater and the need for chemically controlling its dissolved oxygen content, thereby reducing maintenance and operating costs and making automatic, unattended, remotely controlled operation of the boiler practical as well as eliminating the need for blowing down the boiler and minimizing requirements for make-up water. The boiler can be operated dry to remove gas side fouling; and feedwater flow rates can be directly controlled. Orifice-generated pressure drops at the inlets of the boiler tubes which are relatively large compared to the pressure drop in the rest of each tube eliminate the flow instability that is characteristic of once-through boilers.

7 Claims, 10 Drawing Figures

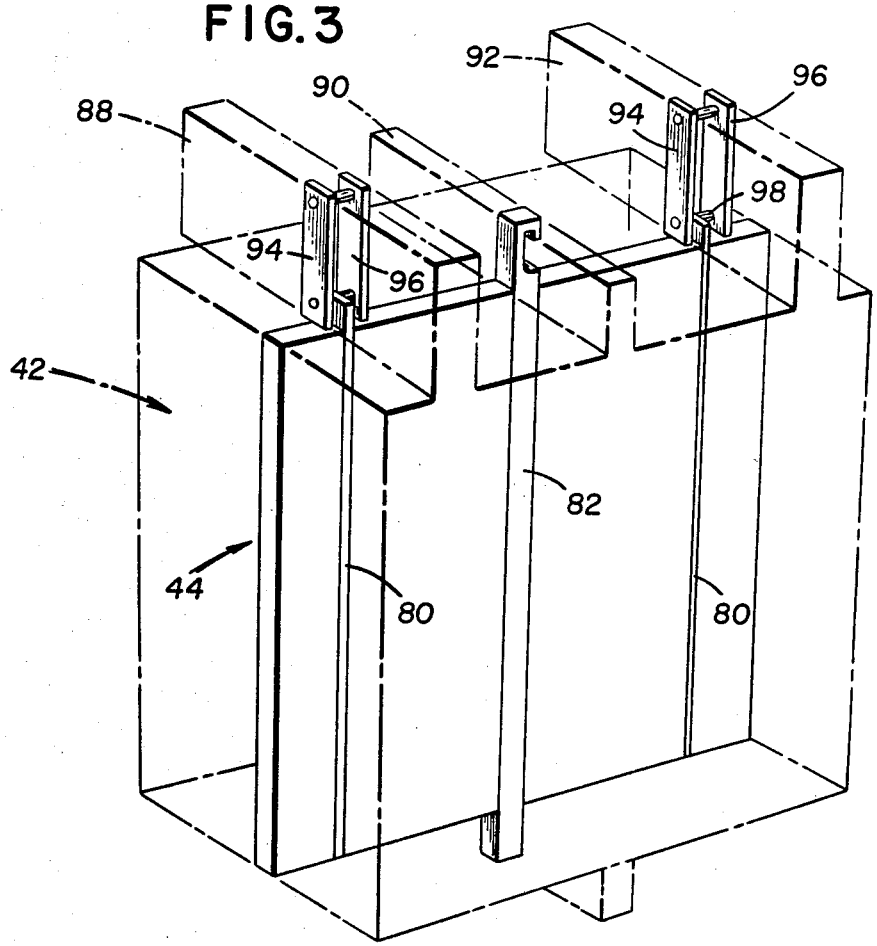

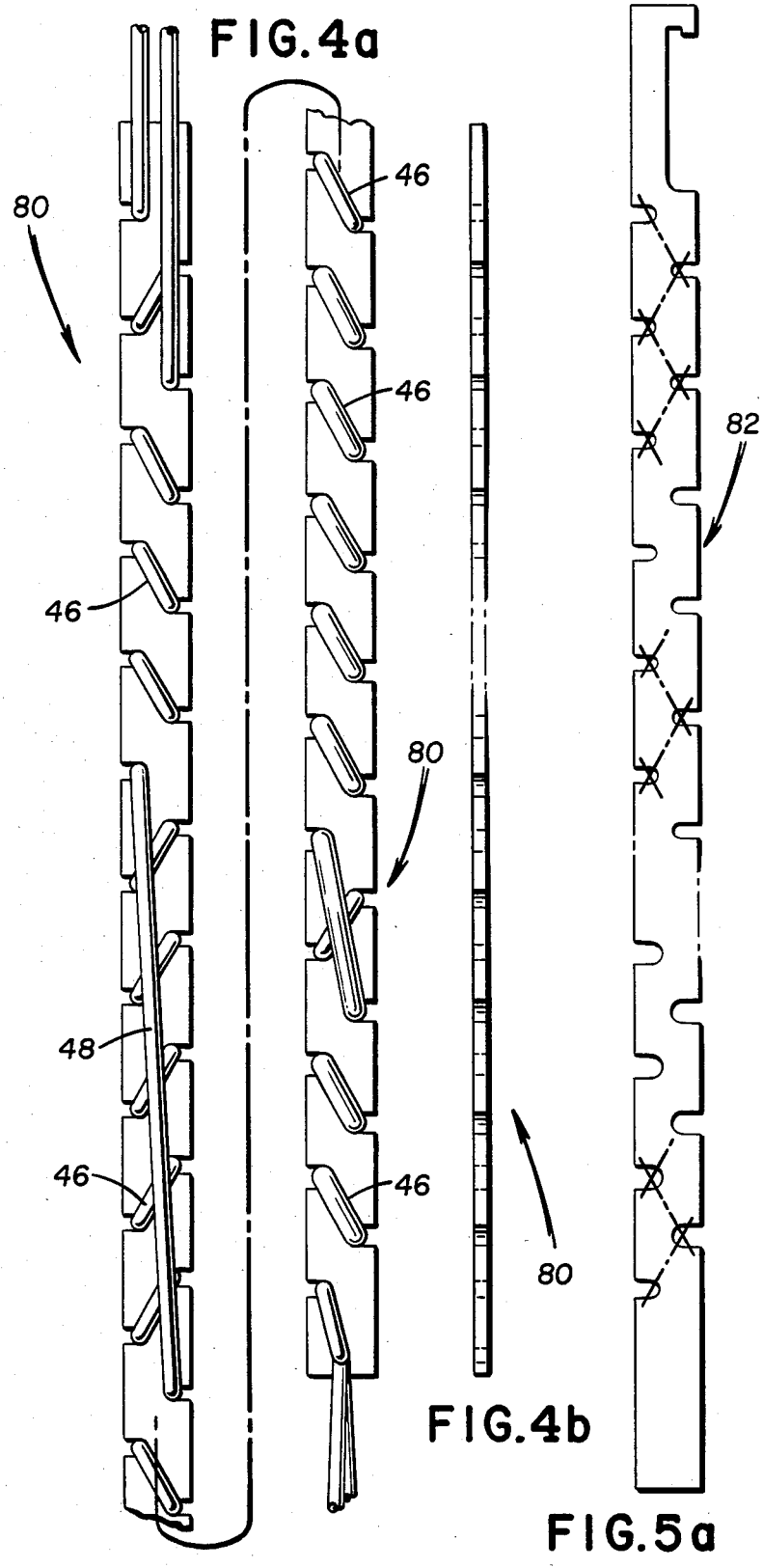

STEAM GENERATORS AND COMBINED CYCLE POWER PLANTS EMPLOYING THE SAME

This is a continuation of application Ser. No. 483,437, filed Apr. 8, 1983 (abandoned).

TECHNICAL FIELD OF THE INVENTION

The present invention relates to steam generators (or boilers) and, more particularly, to novel, improved steam generators of the once-through type.

The novel once-through steam generators disclosed herein are intended primarily for combined cycle power plants; and the principles of the present invention will, consequently, be developed primarily by reference to that application. This is, nevertheless, being done for the sake of convenience and clarity and is not intended to limit the scope of the invention as defined in the appended claims.

A combined cycle power plant is one in which thermal energy contained in the exhaust gases of a gas turbine engine is recovered and converted to mechanical energy by using those gases to generate steam and employing the steam as the motive fluid for a steam turbine.

BACKGROUND OF THE INVENTION

Conventional steam boilers have a number of economic shortcomings and cause many operating problems in combined cycle applications, particularly those of small capacity using gas turbines in the 4000-25000 Kw range. Specifically:

Start-up and shut down procedures are complex. Attended operation is mandatory, and as many as seven hours may be needed to carry out the procedure.

A complex chemical feedwater treatment system is required. Such systems depend on operator vigilance for acceptable operation. The maintenance of chemical supplies and high make-up water requirements are added, related operating burdens.

Large numbers of hydro/pneumatic/mechanical devices are employed in the control systems of conventional boilers. These are subject to malfunction which makes maintenance costs high and reduces boiler availability.

Heat recovery is low because conventional boilers only produce steam at a single pressure. Consequently, even at high expense, only a moderate improvement in station heat rate may be obtained.

Tube, valve stem, joint and other leaks are common in conventional boilers. These are difficult and time consuming—and consequently expensive—to repair or plug. Excessive feedwater consumption and maintenance costs and deterioration in performance result.

Conventional boilers are also subject to freezing and related damage during installation and checkout.

DISCLOSURE OF THE INVENTION

There are disclosed herein new and novel boilers in which the foregoing disadvantages are eliminated and other significant advantages obtained.

One important feature of these novel boilers is that they can be made capable of dual pressure steam generation; i.e., of raising steam at two different pressure levels in what amounts to two hydraulically independent boilers sharing a common gas path. As a result, they may be 21-25 percent more efficient in recovering heat than a conventional boiler in a typical combined cycle power plant.

The boilers disclosed herein have a once-through configuration in which the transition from water to superheated steam takes place in continuous tubes or circuits, each having a high and a low pressure section. Unlike conventional boilers, they do not have recirculation or separation drums.

The novel boiler configuration just described eliminates most of the ancillary equipment and controls required by a conventional boiler. This translates directly into lower operating costs, reduced maintenance, increased reliability and availability, and in greater safety because the large inventories of water stored in conventional boilers are eliminated (this additionally eliminates the need for attended operation required by boiler laws in most states). Also, rapid start-ups (three to five minutes in a typical installation) are provided.

Furthermore, reliable, remote, automated operation becomes feasible; and make-up water requirements are substantially reduced to a rate determined by steam turbine seal leakage and minor system leakage.

All components of the novel boilers disclosed herein contacted by water or steam are fabricated of a stainless steel or other corrosion resistant material. This eliminates the complex chemical treatment required in a conventional boiler to control pH and dissolved oxygen in the feedwater, reducing maintenance and operating costs and further tending to make automated operation feasible. Also, the possibility of operator error and consequent damage to the boiler and steam turbine are eliminated. Blowdown is not required because the chemicals which build up mineral deposits in a conventional boiler are eliminated; and make-up water requirements are, consequently, further reduced.

Once-through boilers are subject to flow instability which is a potentially serious problem. In the novel boilers disclosed herein this problem is eliminated by so metering the flow of feedwater to each boiler tube through an orifice that the pressure drop across the orifice is large compared to the drop in the rest of the tube.

Still another feature of the novel boilers disclosed herein is that they can be run dry at high temperatures for extended periods of time. This technique can be employed to remove combustion side fouling from the boiler tubes. The system can be restarted by introducing water into the boiler at a programmed rate without shutting down the gas turbine, which is another obvious advantage.

Yet another advantage of the boilers disclosed herein is that defective tube runs (or steam generating circuits) can be easily removed and replaced on site.

Furthermore, freezing is eliminated as a problem because the boiler tubes are self draining into the hot well of the boiler where the water can easily be heated and kept from freezing.

Yet another of the important advantages of the novel boilers disclosed herein is that a large number of sites of potential leaks are eliminated (these include valve stems and a variety of joints). As a result, the leakage leading to water loss, degradation in performance, and high maintenance costs in conventional boilers is minimized.

PRIOR ART

A number of once-through boilers have heretofore been designed as shown by U.S. Pat. Nos. 1,905,142 issued Apr. 25, 1933 to Burns et al; 3,173,405 issued Mar. 16, 1965 to Evans; and 3,357,411 issued Dec. 12, 1967 to Kamm. However, once-through boilers have heretofore typically been designed along the same lines as conventional boilers. As a consequence they are plagued with many of the same problems as the latter. And as indicated above, conventionally designed once-through boilers are also potentially subject to flow instability.

One of the above pointed out attributes of the novel steam generators disclosed herein is a dual pressure design that maximizes the recovery of thermal energy. A steam generating plant which is similar to the extent that steam is produced at more than one level is described in U.S. Pat. No. 3,144,856 issued Aug. 18, 1964. Otherwise, the patented and herein disclosed steam generators are quite different. For example, the patented steam generator does not have a tube design that would afford efficient heat recovery.

OBJECTS OF THE INVENTION

From the foregoing it will be apparent to the reader that the primary object of the present invention resides in the provision of novel, improved boilers of the once-through type.

Other also important but more specific objects of the invention reside in the provision of boilers as identified in the preceding paragraph:

which are relatively uncomplicated, especially in comparison to conventional steam generators;

which can be rapidly started up and shut down;

which are capable of automated and unattended operation and are not susceptible to freeze related damage arising from operator error;

which do not require complex feedwater treatment and have significantly lower make-up water requirements and a lower feedwater inventory than conventional boilers;

which have high heat recovery rates;

which, in conjunction with the preceding object, are capable of generating steam at two levels;

which have reduced and simpler maintenance requirements, lower operating costs, and increased availability in comparison to conventional boilers and are safer to operate;

which, in conjunction with the preceding object, have a design which is relatively free of sites for potential leaks and which facilitates the replacement of defective tubes;

which do not require blowdown;

which are not subject to flow instability;

in which all materials in contact with steam or water are fabricated of corrosion resistant materials.

BRIEF DESCRIPTION OF THE DRAWINGS

In the drawings:

FIG. 3 is a generally diagrammatic view of the internal components of the boiler;

FIG. 4A is a left-hand end view of one of a number of essentially identical circuit assemblies in which steam is generated in the boiler;

FIG. 4B is a side view of an end support strap incorporated in the circuit assembly;

FIG. 5A is a side elevation of a center support strap incorporated in each of the circuit assemblies;

FIG. 5B is an end elevation of the center strap;

FIG. 8 is the fragment of FIG. 2 identified by reference numeral ⑦ in that Figure to an enlarged scale.

A BEST MODE OF CARRYING OUT THE INVENTION

Figure 1:
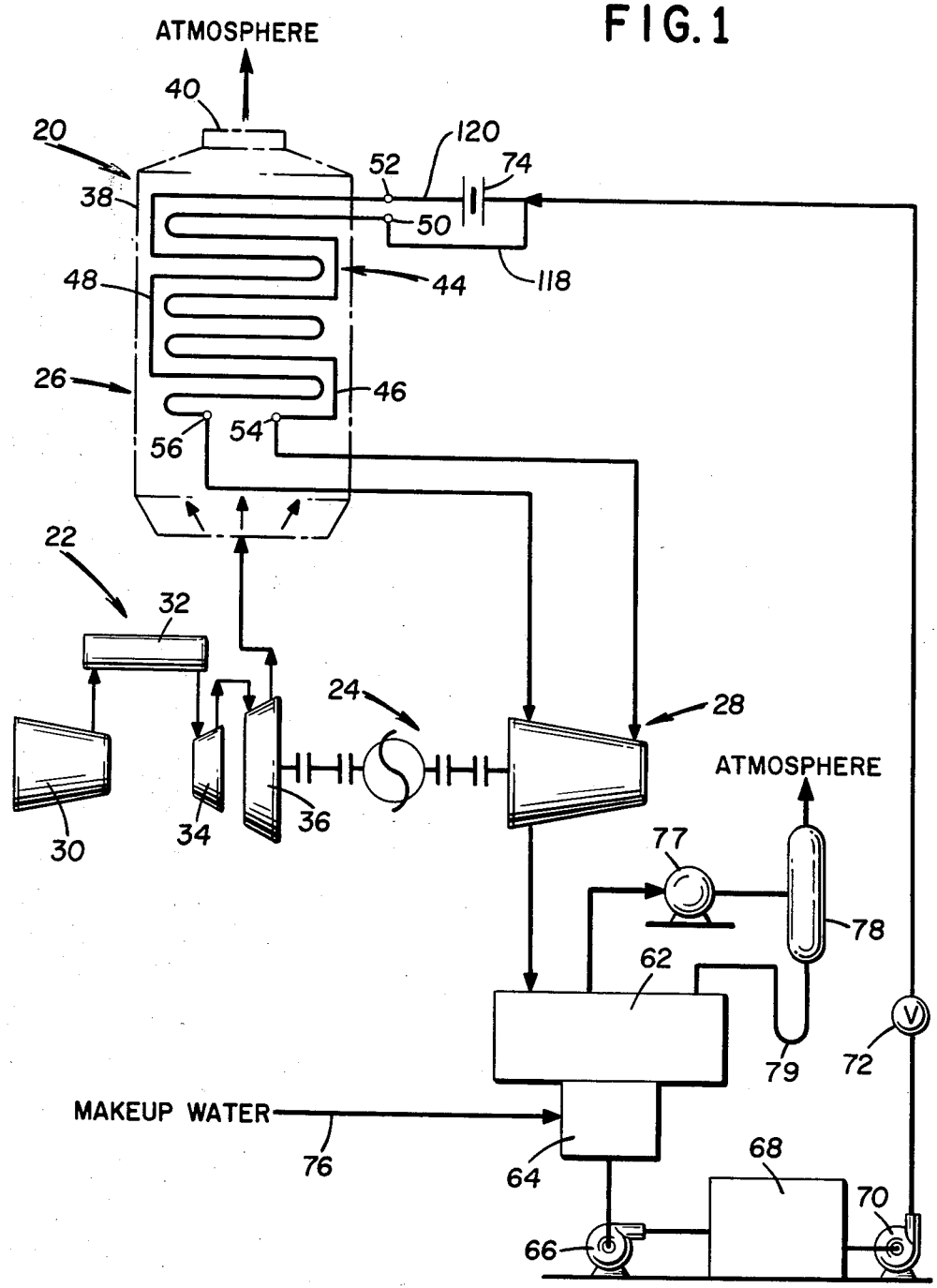
FIG. 1 is a schematic view of a combined cycle power plant which includes a once-through boiler constructed in accord with and embodying the principles of the present invention.

Referring now to the drawing, FIG. 1 depicts a combined cycle power plant 20 constructed in accord with and embodying the principles of the present invention. For the most part, the components of this system are of conventional or otherwise familiar construction. Those components will be described herein only to the extent necessary for an understanding of the present invention.

The major components of power plant 20 include a gas turbine engine 22 drive connected to an alternator 24, a once-through boiler 26 embodying the principles of the present invention in which steam is generated by thermal energy recovered from the hot gases exhausted from gas turbine engine 22, and a steam turbine 28 also drive connected to alternator 24 and employing the steam in boiler 26 as a motive fluid.

In power plant 20, steam turbine 28 also drives the exemplary load; viz., alternator 24. However, it can equally well be employed to drive a load which is different from the load being driven by gas turbine engine 22.

The illustrated gas turbine engine is of conventional configuration; it includes a compressor 30, a combustor 32, a gas producer turbine 34 for driving compressor 30, and a power turbine 36 which drives alternator 24. Hot gases exhausted from power turbine 36, typically at a temperature in the range of 427°–482° C., are ducted to, and flow upwardly through, the casing 38 of steam generator 26. Typically, these gases will be exhausted to atmosphere through stack 40 at a temperature on the order of 112° C. The heat thus recovered is typically 21–25% higher than can be recovered in the unfired boilers heretofore employed in combined cycle power plants.

The boiler 26 illustrated in FIG. 1 has a once-through, dual pressure configuration. It includes a steam generating module 42 (See FIGS. 2 and 3). In one actual boiler design in accord with the principles of the present invention this module is made up of 40 steam generating circuit assemblies 44 each including a high pressure tube 46 and a low pressure tube 48. In each of these tubes a phase change of water to saturated steam and from saturated steam to superheated steam occurs in a continuous flow path extending from the inlet 50 (or 52) to the outlet 54 (or 56) of the tube as the water flows downwardly through the tube in efficient counterflow relationship to the flow of the hot gas turbine engine exhaust gases. Thus, different regions in each tube function as a feedwater heater, as a vaporizer, and as a superheater.

High pressure steam generated in tubes 46 of boiler 26 flows into the high pressure section of dual pressure steam turbine 28, and low pressure steam generated in the boiler flows into the low pressure section of the turbine. This turbine may be of any desired construction; for example, that disclosed in U.S. patent application No. 216,778 which was filed Dec. 17, 1980, and is assigned to the assignee of the present application.

Steam exhausted from turbine 28 flows into a conventional water cooled surface condenser 62 where the steam is condensed (other types of condensers such as those using air as the cooling medium can be used instead, if desired). Condensate accumulates in hot well 64 which contains the inventory of feedwater needed for boiler 26. That the feedwater inventory can be contained in this relatively small capacity system component is important because the large mass of saturated water contained in the drums of a conventional boiler, and eliminated in the novel boilers disclosed herein, is a safety hazard and has produced widespread legislation requiring attended boiler operation. This is cost effective and, also, permits remote, unattended operation of combined cycle power plant 20.

From hot well 64, the condensed steam is circulated by condensate pump 66 to a condensate polisher 68. Here, dissolved solids are removed. The condensate is then pumped to steam generator 26 by feedwater pump 70 through a flow control valve 72. This valve matches the feedwater flow rate to the enthalpy in the hot gases supplied to the steam generator from gas turbine engine 22. A fixed orifice 74 on the upstream side of the inlets 50 and 52 to steam generating tubes 46 and 48 splits the feedwater in proper proportions between the high pressure tubes 46 and the low pressure tubes 48.

As indicated above, it has unexpectedly been found that the fabrication of those boiler components wetted by aqueous fluids eliminates the need for chemically removing dissolved oxygen from the feedwater supplied to boiler 26 or for controlling the pH of the feedwater. Instead, physical removal of dissolved oxygen by hot well deaeration has been found adequate to prevent corrosion of the boiler components even without pH control.

Hot well deaeration is effected by a vacuum pump 77 connected to hot well 64 through condenser 62. Oxygen evacuated from the hot well and condenser by the vacuum pump typically contains appreciable amounts of entrained water. Consequently, the evacuated air is pumped into a conventional separator 78. Air is discharged from separator 78 to atmosphere, and water is returned through a trap 79 from separator 78 to condenser 62.

One of the important advantages of the steam generators disclosed herein and discussed above is that the requirement for make-up of feedwater is nominal. For example, one boiler of the type disclosed herein is planned to produce 6,998 kilograms of steam per hour at one exemplary design point. Make-up water requirements for this boiler are less than 2.4 liters per hour. In contrast, make-up water requirements for a conventional blowdown boiler of comparable capacity are ca. 170 liter per hour.

Such make-up water as is required is first demineralized and then supplied to hot well 64 through make-up water line 76.

Figure 2:
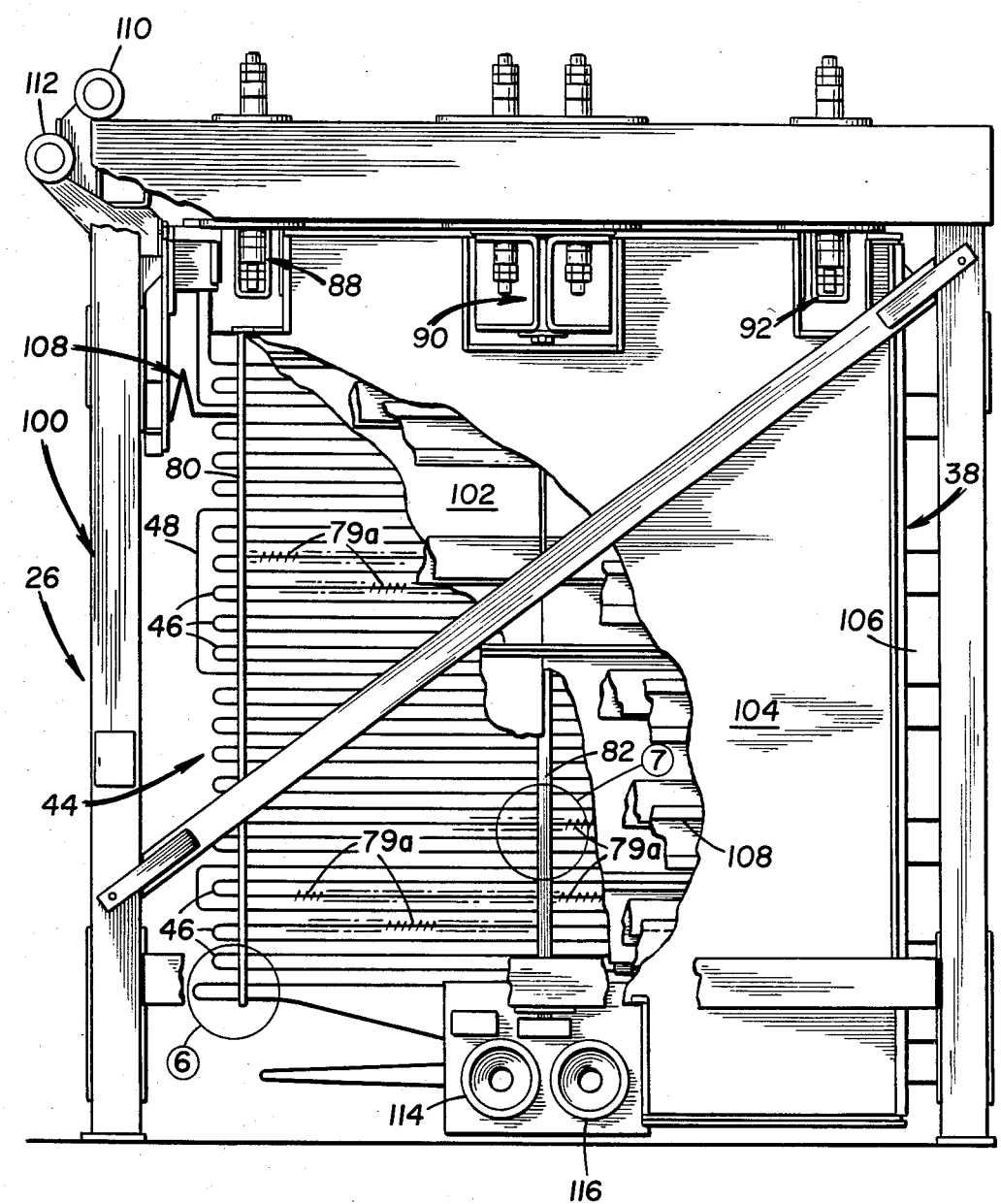
FIG. 2 is a front elevation of the boiler with part of the boiler casing broken away to show its internal components.

Referring now more specifically to FIGS. 2 and 3, each of the 40 separate circuit assemblies 44 making up the steam generating module 42 of boiler 26 has a serpentine high pressure tube 46 with 29 horizontal tube runs connected by U-shaped end bends and, internested therewith, a serpentine low pressure tube 48 with 16 tube runs also connected by U-shaped end bends. In this exemplary boiler, the external tube diameters are 0.625 inch in the low pressure tubes 48 and in the feedwater sections of the high pressure tubes 46, and the wall thickness is 0.058 inch. The external tube diameter is increased to 0.750 inch in the vaporizer and superheater sections of the high pressure tubes 46 to reduce the pressure drop in those tubes, and the wall thickness in those sections is 0.065 inch.

The tube runs are staggered, as can be seen in FIG. 4A, and spaced on two inch centers. Although not critical, the staggered tube run configuration is preferred as this provides maximum heat transfer area per unit volume of steam generating boiler module 42. Specifically, in a typical boiler in accord with the present invention, four rows of staggered run tubes will provide approximately the same transfer of heat from the hot gases to the feedwater as seven rows of parallel tubes will.

Solid helical fins (shown diagramatically in FIG. 2 and identified by reference character 79a) surround both the high and low pressure tubes 46 and 48. In the exemplary boiler under discussion, fins 0.028 inch thick and 0.375 inch tall are employed. These fins are spaced at seven fins per inch on the 0.625 inch outer diameter tubes and at nine fins per inch on the 0.750 inch outer diameter tubes. The use of finned tubing is another important practical feature of the present invention as a finned tube can provide up to ten times the heat transfer surface area of a bare tube.

As indicated above, a number of desirable attributes of those boilers disclosed herein such as reduced maintenance and operating costs, simplification of automatic operation, and elimination of possibilities for operator error are obtained by the use of corrosion resistant materials, thereby eliminating the need for controlling the pH of the boiler feedwater or for chemically controlling its dissolved oxygen content. To this end, tubes 46 and 48 are made of such a material, typically a nickel-chromium-iron containing, high temperature and corrosion resistant alloy (e.g., Incoloy 800).

The other boiler components in the water-steam circuit are also fabricated of corrosion resistant materials such as those just discussed or of Type 316 or 321 stainless steels as a further example.

Another advantage of fabricating the tubes 46 and 48 and other water or steam wetted boiler components from materials such as those just described is that the boiler can be operated dry for extended periods of time. As indicated above, this mode of operation can be employed to rid the boiler tube and other surfaces contacted by hot gases of soot or other gas side fouling.

Still another advantage of using corrosion resistant materials for the purpose just described is that they make the boiler capable of withstanding corrosion in marine environments, making it eminently suitable for offshore platform and similar applications.

Referring again to the drawing, the horizontal runs of the high pressure tube 46 and of the low pressure tube 48 in each of the circuit assemblies 44 are fixed to vertical end straps 80 and a vertical center strap 82 (see FIGS. 4A, 4B, 5A, and 5B).

Figure 7:
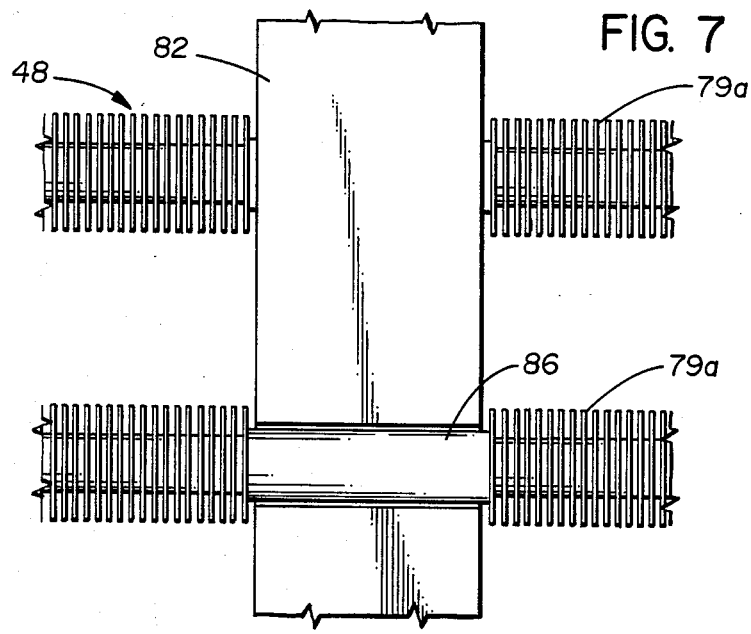
FIG. 7 is the fragment of FIG. 2 identified by reference numeral ⑥ in that Figure to an enlarged scale.

The end straps are configured to accept shouldered sleeves 84 (see FIG. 7) which are brazed to the tubes at the ends of the finned areas. With the 40 circuit assemblies 44 disposed in the side-by-side arrangement shown in FIG. 3, the end straps 80 combine to form two side walls defining the flow path of the hot gases through boiler 26.

The center strap 82 of each circuit assembly 44 is notched to accept sleeves 86 (see FIG. 8) which are brazed onto the fins at the midspan of each tube run. This arrangement is significant as it permits continuous finning of the tube runs. The center straps are positioned by alternating flares (not shown) on sleeves 86 on opposite sides of the strap.

Referring now to FIGS. 2 and 3, the circuit assemblies 44 made up of high and low pressure steam generating tubes 46 and 48 and the end and center straps or hangers 80 and 82 are suspended from horizontal supports 88, 90 and 92 which cross the gas path through boiler 26. In particular, end hangers 80 are suspended from beams 88 and 92 by support straps 94 and 96. The upper ends of straps 94 and 96 are pinned to the associated hanger 80 by fasteners 98. The upper ends of center hangers 82 are configured to engage a ledge (not shown) running along center support beam 90.

This hanger and strap arrangement by which the tubes of the various circuit assemblies 44 are suspended is important because it provides a high degree of thermal compliance. This furthers the capabilities of boiler 26 to be operated dry for the removal of gas side fouling without causing structural damage to the boiler.

Beams 88, 90, and 92 are supported from a cold frame 100 of post-and-beam construction. The details of this frame are not part of the present invention; and they will, consequently, not be described herein.

The cold frame also supports a front liner 102 and a rear liner (not shown). These two liners cooperate with the assembled end straps 80 of the circuit assemblies 44 to define the gas path through boiler 26.

Also supported from cold frame 100 is an outer casing composed of a front panel 104, two side panels 106 (only one of which is shown), and a rear panel (not shown). The panels are separated from the assembled end straps 80 and the front and rear inner liners by spacers 108.

This is an important safety feature. Any steam that escapes through a leak or rupture will be ducted upwardly through the boiler and out stack 40 and will consequently not endanger personnel in the area of the boiler.

Cold frame 100 also supports feedwater inlet headers 110 and 112. As shown in FIG. 2, the steam outlet headers 114 and 116 are enclosed within and supported by the outer casing of boiler 26 so that they can drop downwards as the boiler temperature increases. This, too, insures that escaping steam will be safely vented from the boiler rather than endangering personnel in the vicinity.

Figure 6:
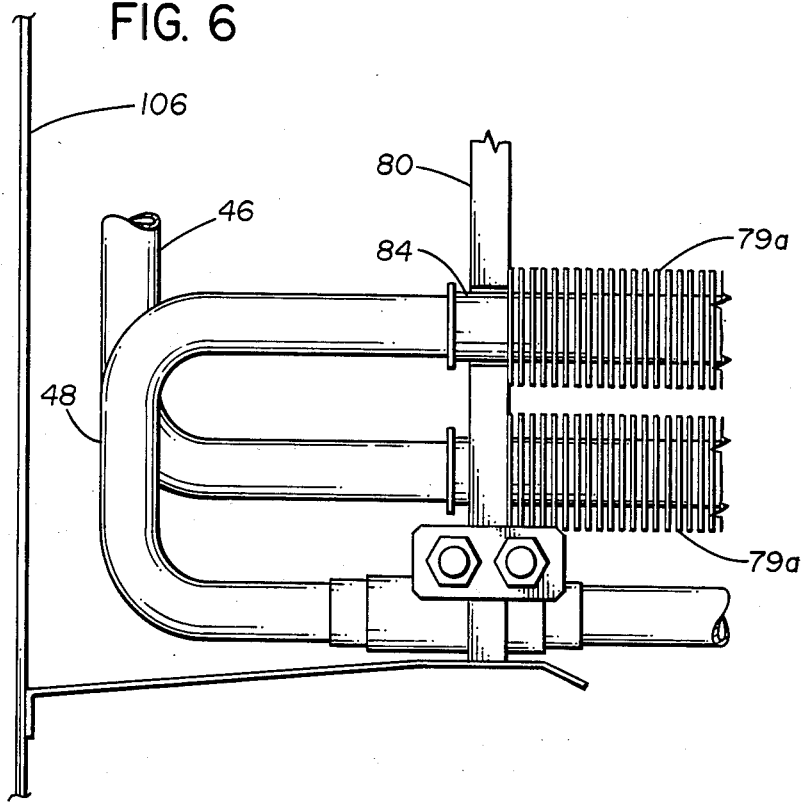
FIG. 6 is a partially sectioned view of the structure at the inlet end of a circuit assembly tube.

Referring now to FIGS. 1, 2, and 6, feedwater is supplied to each of the high and low pressure steam generating tubes 46 and 48 from inlet headers 110 and 112 through a tube 118 or 120. A filter and orifice assembly 122 is installed in each feedwater supply tube. Typically, the orifice will be sized to create a substantial pressure drop across the tube 46 or 48 with which the orifice assembly is associated. This insures boiling stability in the steam generating tubes and equal flow distribution of the feedwater among the paralleled high pressure tubes and the paralleled low pressure tubes.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description; and all changes which come within the meaning and range of equivalency of the claims are therefore intended to be embraced therein.

We claim:

1. A once-through boiler comprising: a vertical casing having a gas inlet and a gas outlet respectively located at the lower and upper ends thereof; an overhead support structure in said casing; a plurality of independent steam generating circuits hung from said support structure, each of said circuits comprising a single, sinuous low pressure tube with horizontal tube runs and a high pressure tube of similar configuration internested with the low pressure tube, said horizontal tube runs being so staggered as to increase the transfer of heat from hot gases flowing upwardly through said casing to said high and low pressure tubes and said high pressure tubes each having feedwater, vaporizer, and superheater sections with said vaporizer and superheater sections being of greater diameter than the feedwater sections; and a feedwater pump for effecting a flow of water into said low and high pressure tubes at the inlet ends thereof.

2. A once-through boiler comprising: a vertical outer casing having a gas inlet and a gas outlet at the lower and upper ends thereof; an overhead support structure in said outer casing; a cold frame of post-and-beam construction within said outer casing and supporting said overhead support structure, a plurality of independent steam generating circuits each comprising a single, sinuous low pressure tube and a high pressure tube of similar configuration internested with the low pressure tube; means including hangers at the ends thereof for supporting said steam generating circuits from said overhead support structure with said hangers in juxtaposed relationship and cooperating to provide walls at the opposite ends of said cold frame; front and rear liners supported from said cold frame and cooperating with said hangers to provide an inner casing which defines an enclosed gas path upwardly through said outer casing from said inlet to said outlet; and a feedwater pump for effecting a flow of water into said low and high pressure tubes at the inlet ends thereof.

3. A once-through boiler as defined in claim 2 wherein said outer casing is so spaced from said inner casing as to provide therebetween a passage which surrounds said inner casing and communicate at its upper end with said gas outlet, whereby steam escaping from said steam generating circuits is ducted upwardly through said boiler and discharged through said gas outlet to thereby keep said escaping steam from endangering personnel or damaging equipment in the vicinity of the boiler.

4. A once-through boiler as defined in claim 3 which includes steam outlet headers to which the high and low pressure tubes of the steam generating circuits are connected, said outlet headers being housed within said outer casing and in fluid communication with the passage between said inner and outer casings to thereby keep steam escaping from said steam generating circuits or headers or from the tube-to-header connections from endangering personnel in the vicinity of the boiler by venting said steam therefrom as aforesaid.

5. A once-through boiler comprising: a vertical casing having a gas inlet and a gas outlet at opposite ends thereof; an overhead support structure in said casing; a plurality of independent steam generating circuits hung from said support structure, each of said circuits comprising a finned, multiple-run low pressure tube and a finned, multiple run high pressure tube internested with the low pressure tube; and a feedwater pump for effecting a flow of water into said low and high pressure tubes at the inlet ends thereof, the means by which said steam generating circuits are hung from said overhead support structure comprising horizontally oriented, spaced apart beams and sets of independent center and end straps depending from said beams and having notches for receiving the runs of the high and low pressure tubes of said steam generating circuits to thereby support said tubes from said beams, there being sleeves which surround said tubes and which are received in the notches in said center straps and thereby permit continuous finning of said tubes.

6. A once-through boiler as defined in claim 5 which includes shouldered sleeves fixed to said tube runs at the opposite ends thereof, the shoulders on said sleeves abutting the end straps by which said tubes are supported and thereby locating said steam generating circuits longitudinally with respect to said overhead support structure.

7. A once-through boiler as defined in claim 1 which also has means for producing boiling stability in the high and low pressure tubes of said steam circuits and for insuring that the feedwater supplied to said steam generating circuits is equally distributed among those circuits, said last-mentioned means comprising an orifice means at the inlet end of, and sized to produce a substantial pressure drop across, each of said low pressure tubes.

* * * * *